(12) United States Patent
Atlas et al.

(10) Patent No.: US 8,571,829 B2
(45) Date of Patent: Oct. 29, 2013

(54) DETECTING OBJECTS IN SHIPPING CONTAINERS BY VIBRATION SPECTRAL ANALYSIS

(75) Inventors: Les Atlas, Seattle, WA (US); Patrick McVittie, Seattle, WA (US)

(73) Assignee: University of Washington Through Its Center for Commercialization, Seattle, WA (US)

( * ) Notice: Subject to any disclaimer, the term of this patent is extended or adjusted under 35 U.S.C. 154(b) by 300 days.

(21) Appl. No.: 12/501,092

(22) Filed: Jul. 10, 2009

(65) Prior Publication Data

US 2010/0161254 A1    Jun. 24, 2010

Related U.S. Application Data

(60) Provisional application No. 61/079,960, filed on Jul. 11, 2008.

(51) Int. Cl.
G01G 17/00    (2006.01)
G01G 3/16    (2006.01)

(52) U.S. Cl.
USPC .............................. 702/174; 702/56; 73/580

(58) Field of Classification Search
USPC .......................................................... 702/56
See application file for complete search history.

(56) References Cited

U.S. PATENT DOCUMENTS

| | | | |
|---|---|---|---|
| 7,106,244 B2 | 9/2006 | Hsu | 342/27 |
| 7,171,844 B2 | 2/2007 | Cunningham et al. | 73/73 |
| 7,324,921 B2 | 1/2008 | Sugahara et al. | 702/183 |
| 7,397,377 B1 | 7/2008 | Young et al. | 340/572.4 |
| 2006/0181413 A1 | 8/2006 | Mostov | 340/539.22 |
| 2007/0006652 A1* | 1/2007 | Weldon et al. | 73/579 |
| 2007/0096037 A1* | 5/2007 | Shapiro et al. | 250/394 |
| 2007/0276619 A1* | 11/2007 | Sugahara et al. | 702/82 |

FOREIGN PATENT DOCUMENTS

| | | |
|---|---|---|
| EP | 0 119 790 | 9/1984 |
| WO | WO 2008/051188 | 5/2008 |

* cited by examiner

*Primary Examiner* — Sujoy Kundu
*Assistant Examiner* — Regis Betsch
(74) *Attorney, Agent, or Firm* — Kilpatrick Townsend and Stockton LLP

(57) ABSTRACT

Objects in a cargo shipping container are detected by measuring vibration resonant frequency peaks of the container. The mass of an object on the floor of the container effects the vibration resonance of the container, enabling the object to be detected. A vibration source and a plurality of accelerometers are either attached to the steel structure of the container, or are disposed on a supporting structure, such as a cargo crane or lift, so that they contact the container. The vibration source causes the container to vibrate, and the accelerometers detect the vibration resonance of the container. A mismatch between a cargo manifest and an observed cargo, or detection of an object having relatively high mass, e.g., due to lead shielding, can justify a manual inspection. The process uses synchronous processing to achieve the sensitivity needed, is unobtrusive, and does not slow the flow of cargo through a facility.

30 Claims, 14 Drawing Sheets

FIT PARAMETRIC MODELS
SIMPLIFIED EXAMPLE OUTPUT

| FIT SCORE | PARAMETRIC MODEL NAME | DIAGRAM AND PARAMETER SUMMARY | DETAILED ANALYSIS |
|---|---|---|---|
| 0.85 | ONE DENSE MASS IN UNIFORM FILL | S: 2' X 1' X 2', W: 200 LBS, D: 25' | CLICK |
| 0.82 | TWO DENSE MASSES IN UNIFORM FILL | S: 1' X 1' X 2', W: 150 LBS, D: 24'<br>S: 2' X 1' X 1', W: 80 LBS, D: 22' | CLICK |
| 0.78 | ONE DENSE MASS IN EMPTY CONTAINER | S: 2' X 1' X 2', W: 200 LBS, D: 25' | CLICK |

272 — (row 1)
274 — (row 2)
276 — (row 3)

270

KNOWN CONTAINER MATCHES
SIMPLIFIED EXAMPLE OUTPUT

MATCH RESULTS

| MATCH SCORE | MATCH DESCRIPTION | DIAGRAM | DETAILED ANALYSIS |
|---|---|---|---|
| 0.99 | ENGINE BLOCKS MOUNTED ON STANDARD PALLETS WITH A UNIFORM ARRANGEMENT. SOURCE: EXAMPLE PACKED CONTAINER ID: 55466 | CLICK FOR PHOTOS | CLICK |
| 0.95 | ENGINE BLOCKS MOUNTED ON STANDARD PALLETS WITH A NON-UNIFORM ARRANGEMENT. SOURCE: EXAMPLE PACKED CONTAINER ID: 55466 | CLICK FOR PHOTOS | CLICK |
| 0.78 | ENGINE BLOCKS MOUNTED ON STANDARD PALLETS WITH A UNIFORM ARRANGEMENT. SOURCE: FEA MODEL ID: 12467 | CLICK FOR PHOTOS | CLICK |

*FIG. 22*

HISTORICAL SIMILARITY STATISTICS
SIMPLIFIED EXAMPLE OUTPUT

| SIMILARITY RESULTS | | |
|---|---|---|
| HISTORICAL DATA: | | |
| EXACT MATCHES WITH PREVIOUS CARGO: | 82 | |
| EXACT MATCH FREQUENCY: | 1 PER 10043 CONTAINERS | |
| SIMILAR MATCHES WITH PREVIOUS CARGO: | 1203 | |
| SIMILAR MATCH FREQUENCY: | 1 PER 543 CONTAINERS | |
| THREAT MATCHES: | 0 | |
| FLAGS: | | |
| UNIQUE FOR THIS SHIPPER | | |
| UNIQUE FOR THIS SHIPPING ADDRESS | | |
| UNIQUE FOR THIS SHIPPING MANIFEST | | |

THREAT ANALYSIS
SIMPLIFIED EXAMPLE OUTPUT

THREAT ANALYSIS RESULTS

| FLAG | DETECTION | THREAT | RECOMMENDATION |
|---|---|---|---|
| | EMPTY CONTAINER: | 0 | |
| | COMMON CARGO MATCH: | 1 | |
| | UNCOMMON CARGO MATCH: | 2 | |
| | UNIQUE CARGO MATCH | 5 | |
| ◯ | MOVEMENT DETECTED ANIMAL OR HUMAN | 6 | SEARCH OR SCAN |
| | SMALL DENSE OBJECT DETECTED POSSIBLE NUCLEAR DEVICE | 10 | RADIATION DETECTION AND SEARCH OR SCAN |
| | CONTRABAND MATCH DETECTED ARMS | 7 | EXPLOSIVES SWAB, CHEMICAL SENSORS, SEARCH OR SCAN |
| | DRUGS | 6 | CHEMICAL SENSORS AND SEARCH OR SCAN |

*FIG. 24*

DETECTING OBJECTS IN SHIPPING CONTAINERS BY VIBRATION SPECTRAL ANALYSIS

RELATED APPLICATIONS

This application is based on a prior copending provisional application Ser. No. 61/079,960, filed on Jul. 11, 2008, the benefit of the filing date of which is hereby claimed under 35 U.S.C. §119(e).

BACKGROUND

The majority of international trade is shipped in containers that are loaded into the holds of ships at a port of origin and then off-loaded at ports where the shipping containers can be moved by train and truck to the final intended destinations. FIG. 1 illustrates a ship and a gantry crane being used to unload containers from the ship at such a port. There are 10 million containers shipped to the United States annually. As recognized by the 2007 U.S. Federal Government House Resolution 4954, passed into law in 2007, all shipping containers need to be inspected for possible sources of radioactivity, and or radiation shields. However, in reality, Customs and Border Protection (CPB) does not have, and will not be obtaining the resources required to physically inspect all shipping containers entering the U.S. CPB currently randomly selects and inspects only two to four percent of the total containers entering this country. It is perceivable that international terrorist groups will attempt to exploit this vulnerability. The potential risk that containers holding nuclear bombs might be off-loaded from a ship at a foreign port and transported to other locations in this country raises significant security concerns for the nation. Accordingly, it is highly desirable to provide a new technology that can be used to verify the safety of shipping container contents, by detecting nuclear material that might be contained therein.

Radiation detection equipment can be used to detect radioactive materials that are used in nuclear bombs hidden within shipping containers, and steps are being taken to check every shipping container entering this country for such materials. However, it is clear that radioactive materials may not be easily detected with radiation sensors if the radioactive materials are enclosed with lead or other high mass density shielding. Accordingly, it is also desirable to be able to detect objects having relatively high mass density that might be evidence of a shielded nuclear bomb disposed within a container.

Since it would be impractical to open every container passing into and through U.S. seacoast ports for inspection, a detection scheme must be provided for determining when objects with relatively high mass density (that might represent a shielded nuclear bomb) are disposed within a container, particularly when the freight indicated on the manifest listing for the container does not indicate that any such object having a relatively high mass density should be included. In contrast, there should be no problem in searching only containers in which an object of relatively high mass density is detected, and only if there is no corresponding object indicated on the manifest listing, since that combination of circumstances should be uncommon.

FIG. 2 is a schematic diagram 20 that illustrates the relationship between a cargo manifest 22 and objects detected in a container, such as cargo of relatively lower mass density (examples shown are grain, dirt, or other powdered goods 24, and rags, clothing, or brooms 26) which when detected in the container would not likely be cause for inspecting the container. In contrast, cargo of relatively higher mass density (examples shown are chairs, engines, or tools 28) may be cause for inspecting the container. Similarly, if a high mass object is detected in a container that is otherwise empty based on cargo manifest 22, then that container may also require inspection as indicated by a block 30.

Clearly, if based on the manifest listing, a container is supposed to hold high mass density objects, there would be little motive to search a container in which such an object was detected. Moreover, the distribution of mass (i.e., of objects) within the container may provide further clues indicating that something other than the expected contents are included therein. For example a shipment of engine blocks might be expected to be generally uniformly distributed within a shipping container. Yet, if an object with relatively higher mass density than that of the engine blocks was detected in the container, it is likely that a manual search of the container contents would be justified to determine the nature of such an object.

Clearly, a technique for determining the mass density of objects in a container would best be implemented without interrupting the flow of containers being offloaded from a ship or being moved into storage, or onto trucks or rail cars. Accordingly, it would be desirable to detect objects with a relatively high mass density in a container using components that are included in devices employed at a port to move containers, such as the gantry crane shown in FIG. 1. Further, the process for detecting objects with relatively high mass should be carried out substantially without slowing the handling of the containers. These and other desired features and functionality will determine how this monitoring technique might be efficiently implemented.

SUMMARY

This application specifically incorporates by reference the disclosures and drawings of each patent application identified above as a related application.

In consideration of the concerns discussed above, an exemplary method uses vibration analysis to detect an object within a freight shipping container, based on a mass of the object. While a container is being supported by a container handling mechanism, a vibration source is employed for exciting the container to vibrate. Resonant vibrations of the container in response to the excitation of the container by the vibration source are sensed at a plurality of spaced-apart locations disposed in contact with the container. Using a computing device, the resonant vibrations of the container that were sensed are then analyzed, to detect an effect caused by any object disposed within the container, since an object can alter a resonant vibration response of the container as a function of its mass, and the object is thus detected by its effect on a resonant vibration response of the container.

The method can further include the step of deploying a plurality of vibration sensors at the plurality of spaced-apart locations to sense the resonant vibrations of the container. To expedite handling of the container, the vibration source and the plurality of vibration sensors can be supported by the container handling mechanism so that they contact the container while the container is being supported and moved by the container handling mechanism. The plurality of spaced-apart locations on a class of containers for monitoring the resonant vibration response of a container that is a member of the class of containers can be empirically identified by determining maximum sensitivity positions on the container where maximum differences are detected in the resonant vibration response of the container, in a comparison of the container when empty and when loaded with a distributed mass.

The plurality of vibration sensors can be repositioned as required to generally correspond to at least a subset of the maximum sensitivity positions determined for a specific class of the container that is currently being supported by the container handling mechanism (and which is different than the class of container previously lifted by the container handling mechanism). The repositioning of the vibration sensors should occur before the step of detecting the resonant vibrations of the container.

Alternatively, the method can include the step of determining locations for the plurality of vibration sensors as a function of the maximum sensitivity positions for all of the classes of containers that pass through a facility, so that the locations of the vibration sensors are generally optimized for the plurality of vibration sensors on the container handling mechanism when sensing the resonant vibrations of any container being handled by the container handling mechanism. In this case, the vibration sensors are not repositioned when the current container is a member of a different class of containers than a previous container.

The method may further include the step of enabling a comparison of a cargo manifest that indicates contents expected to be within the container, with one or more objects detected in the container. The comparison will determine whether the one or more objects detected were expected to be within the container, based on the cargo manifest. Similarly, the method may enable a comparison of the cargo manifest with a distribution of objects detected within the container, to determine if the distribution of the objects is consistent with the cargo manifest for the container.

Optionally, the method may include the step of comparing a position where an increased level of radiation was detected within a container to a position where an object having a relatively high mass density was detected. This comparison can help to evaluate whether the object may include radioactive material and radiation shielding (such as might be used to conceal a nuclear bomb).

It is also contemplated that the method may provide for modeling an interaction of the container, one or more objects included in the container, and the plurality of vibration sensors, to create a vibration model that is used for characterizing the contents of the container, as a function of a mass of the contents.

As a further option, the resonant vibrations of the container that are sensed at the plurality of spaced-apart locations can be used for localizing a mass distribution of objects comprising a cargo disposed within the container.

Another aspect of this novel approach is directed to a memory medium on which machine readable and executable instructions are stored. When executed, the instructions cause functions that are generally consistent with the steps of the method discussed above to be carried out.

Yet another aspect is directed to an exemplary system for using vibration analysis to detect an object within a freight shipping container, based on a mass of the object. The system includes a container handling mechanism that is configured to lift and support the container. The container handling mechanism includes a plurality of vibration sensors that are brought into contact with the container at a plurality of spaced-apart locations, while the container is being supported by the container handling mechanism. In addition, the container handling mechanism includes a vibration source that is brought into contact with the container while the container is being supported. A computing device is coupled to the vibration source and to the plurality of vibration sensors and includes a memory in which machine readable and executable software instructions are stored, and a processor that is coupled to the memory. The processor executes the software instructions to carry out a plurality of functions that are again generally consistent with the steps of the method described above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is an image illustrating containers on a container ship being unloaded by a ship-to-shore gantry crane, which is a typical step in the handling and moving of such containers at a port;

FIG. 2 is a block diagram showing how detection of the generalized mass and damping of the cargo resonant peaks by objects in a container might be compared to the cargo manifest for determining if the container is okay (because the objects detected correspond to cargo of relatively lower mass density), or may require inspection (i.e., because one or more objects of relatively high mass density are detected and indicated on the cargo manifest, or because the manifest indicates the container is empty, but one or more objects are detected);

FIG. 3 is an isometric view of an exemplary modified straddle bar that is being used for lifting a shipping container approximately one foot off the ground while tests are performed to determine if a vibration source can be used to cause the container to resonate, so that resonant peaks can be detected by a plurality of vibration sensors;

FIG. 4 is a plan or top view of the straddle bar and shipping container of FIG. 3, showing seven accelerometers $A_0$ through $A_6$ and a vibration source $V_0$ mounted on ends of a spreader bar, in contact with the container, and a main control box mounted on the center of the straddle bar with an external connector (or wireless connection) that is coupled to a data collection system (such as a computing device);

FIG. 5 is a schematic cross-sectional side elevational view of a container that is lifted from the ground with a straddle bar that is fitted with the vibration driver and accelerometers as shown in FIGS. 3 and 4, illustrating the effect of a 400 lb.-mass disposed in about the center of the container floor when the vibration source is "chirped" and the resulting vibrations are detected by the spreader bar accelerometers;

FIG. 6 is a schematic cross-sectional side elevational view of a container that is lifted from the ground with a straddle bar fitted with the vibration driver and accelerometers as shown in FIGS. 3 and 4, illustrating the effect of a 25 lb.-mass being dropped by a person weighing about 200 lbs. at two foot intervals longitudinally along the center of the container floor, so that the resulting vibrations are detected by the spreader bar accelerometers;

Figure 11:
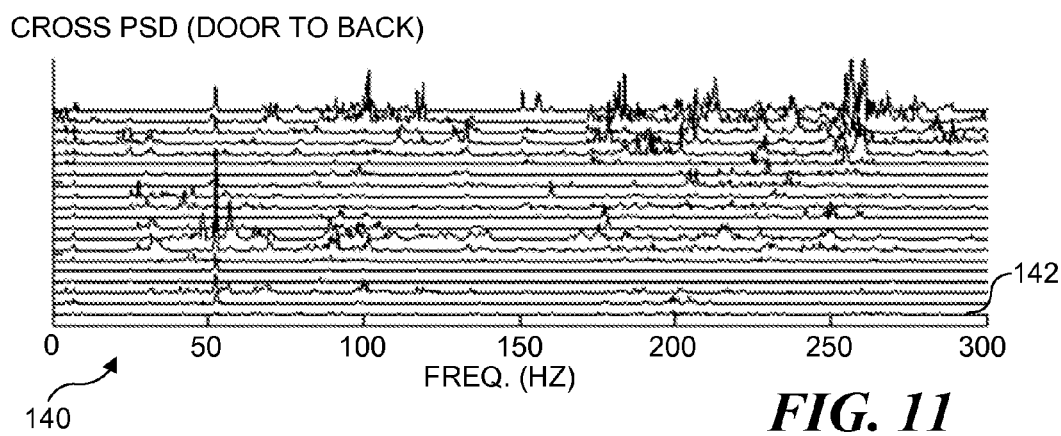
Figure 12:
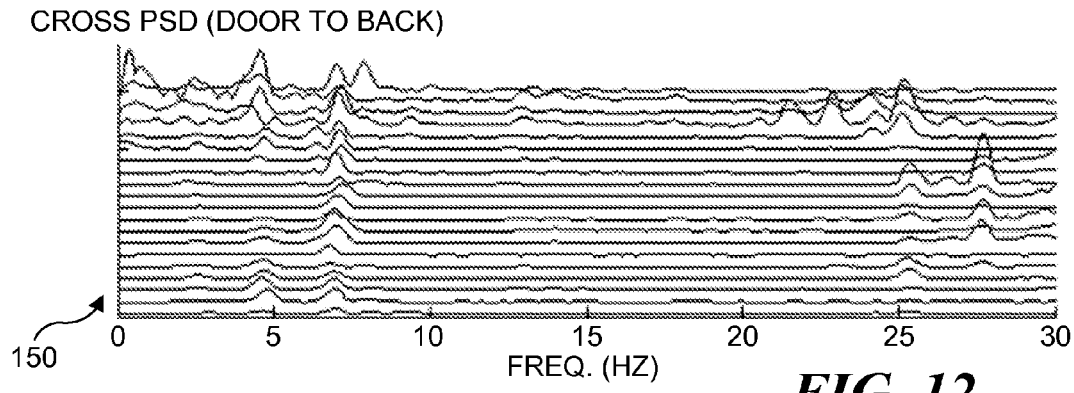
Figure 13:
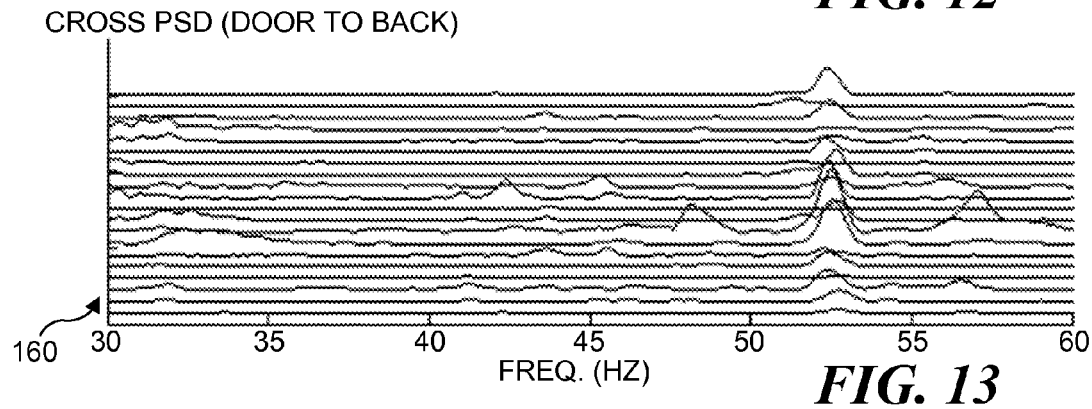
Figure 14:
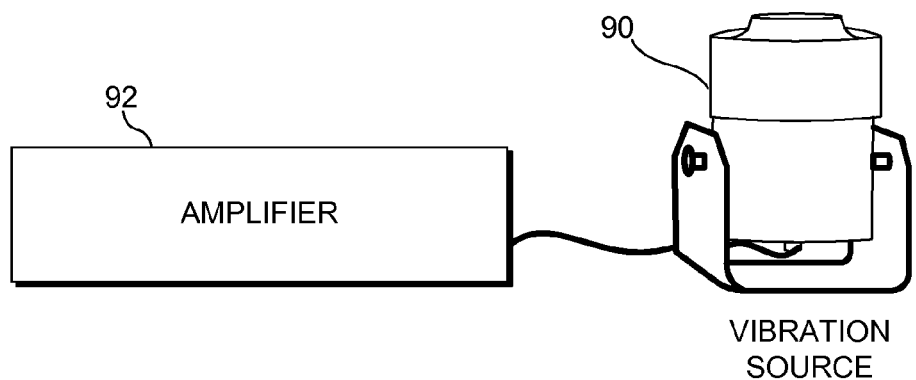
Figure 15:
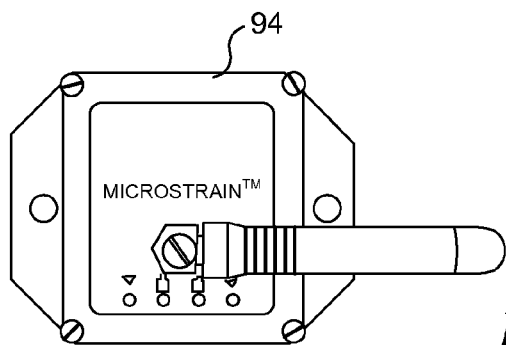
Figure 16:
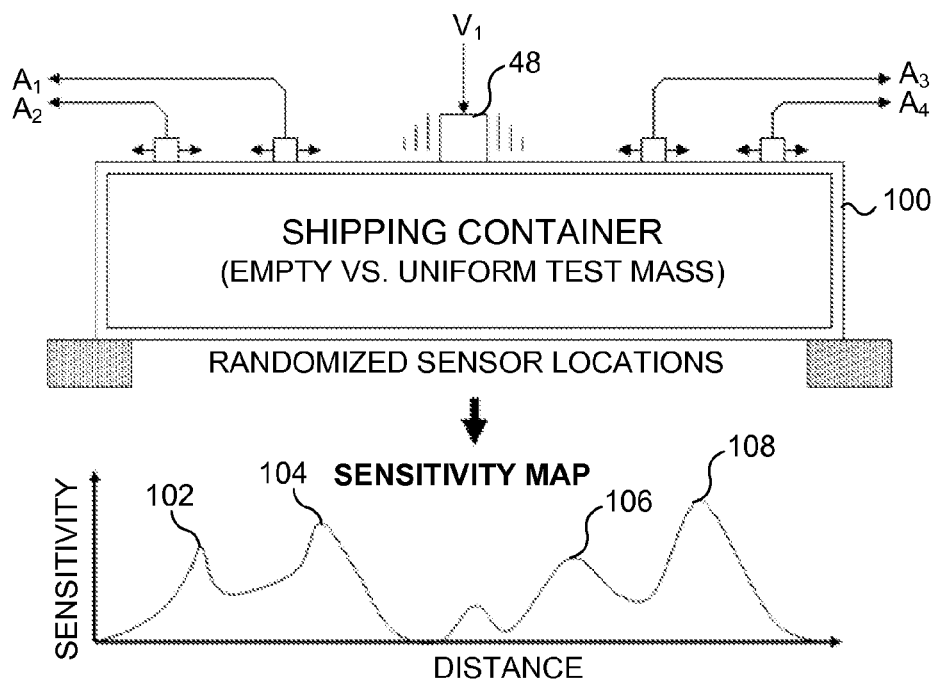
Figure 17:
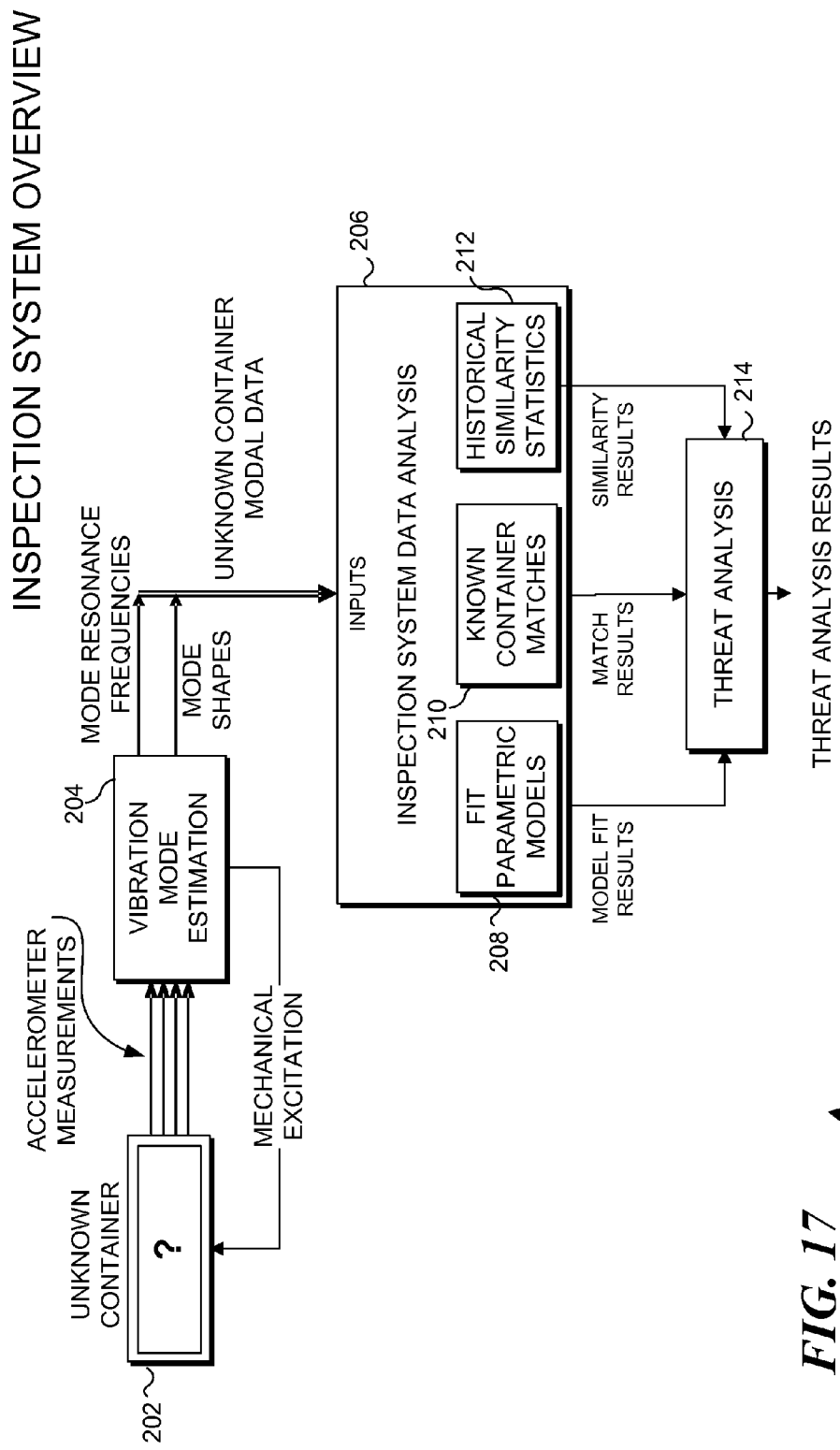
Figure 18:
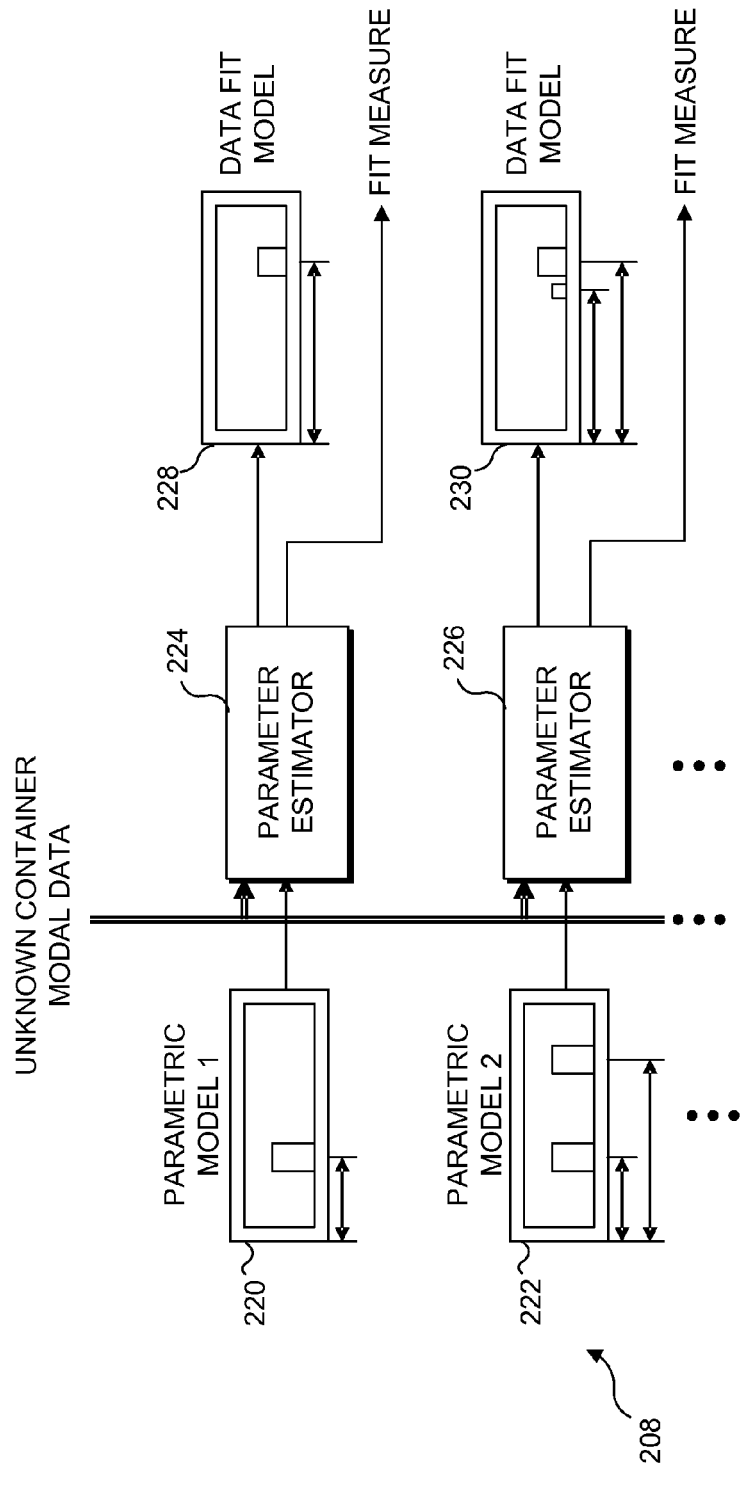
Figure 19:
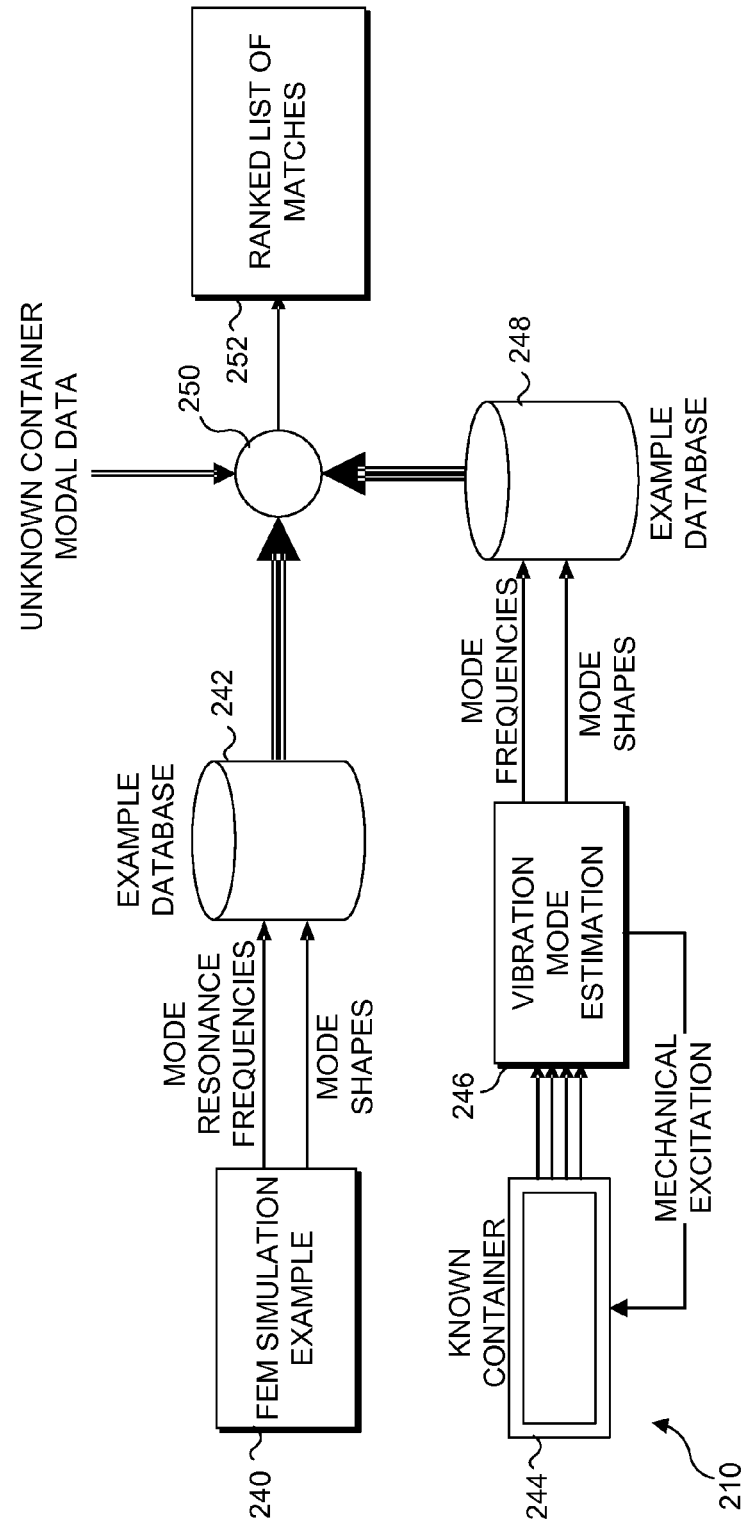
Figure 20:
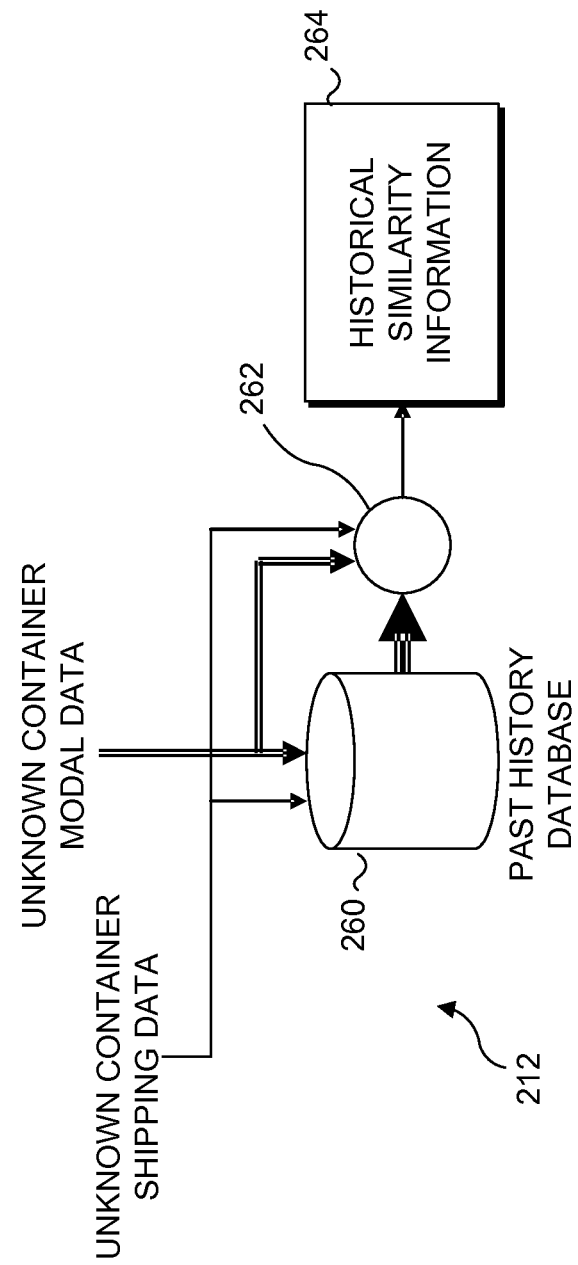
Figure 21:
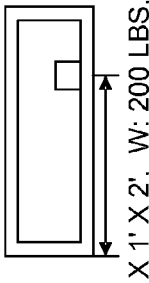

FIG. 11 illustrates offset plots of the cross PSD between all seven accelerometers and shows the location dependant resonances, wherein the bottom plot is the impact closest to the door, while the top plot is the impact closest to the back, each step vertically represents a displacement of 2 ft. (the metal flooring at the back of the container added the rich spectral content at the top of the figure);

FIG. 12 is an expanded view of the plots of FIG. 11, showing resonances that are correlated with the position of the impact of the weight (note—these resonances may have potential uses in imaging the cargo or localizing activity inside a container);

FIG. 13 is another expanded view of the plots of FIG. 11, showing an additional resonance that is correlated with the position of the impact of the weight;

FIG. 14 is a block diagram illustrating a precision vibration source and power amplifier, such as are available from Labworks Inc., for exciting vibration of a shipping container, in connection with the present novel approach;

FIG. 15 illustrates an exemplary wireless accelerometer that is available from MicroStrain, Inc., which is usable in connection with detecting the resonant vibrations of a shipping container in connection with the present approach;

FIG. 16 is a schematic view of a shipping container, showing the location of the accelerometers used to sense resonance vibration of the container in relation to a sensitivity map for the resonant vibrations;

FIG. 17 is an overview of a flowchart illustrating exemplary logical steps implemented during vibrational analysis inspection of containers;

FIG. 18 is a flowchart illustrating exemplary details of the procedure for fitting parametric models to the modal data collected during vibration resonance evaluation of a container with unknown contents;

FIG. 19 is a flowchart illustrating exemplary details of the procedure for matching known containers to the modal data collected during vibration resonance evaluation of a container with unknown contents;

FIG. 20 is flowchart illustrating exemplary details of the procedure for comparing unknown container shipping data to a past history database for such containers to develop historical similarity information;

FIG. 21 is a table illustrating fit scores for three different exemplary parametric models, relative to the vibrational analysis data collected for a container with unknown contents;

FIG. 22 is a table illustrating fit scores for three different known exemplary container matches, relative to a container with unknown contents;

FIG. 23 is a table illustrating exemplary historical similarity statistics derived from historical data for data for other containers that either are exactly the same or similar to the present unknown contents container; and FIG. 24 is an exemplary threat analysis table showing the threat level for various detected types of cargo and the recommendation for dealing with it.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Overview

A novel inspection method described below determines the absolute or relative mass distribution of objects disposed within a cargo shipping container by measuring resonant frequency peaks of the mechanical resonance modes of the container and its contents when the container is excited into vibration using a vibration source. The resonant frequencies are determined by sensing with spaced-apart accelerometers, which are coupled to the structure of the container directly, or supported in contact with the container by a cargo crane, spreader, lift, straddle-carrier, or other container handling device.

The resulting mass density of objects in the container image can be compared to a cargo manifest and the observed cargo to detect any mismatch, which might, for example, correspond to unwanted heavy cargo, such as lead shielding (around nuclear material), inside the container. Most importantly, this inspection to detect relatively high mass density objects or mismatches between the contents detected and the cargo manifest can take place during existing container-handling operations, is unobtrusive, and does not slow the flow of cargo being processed through a port or other location.

Resonant vibration inspection of cargo shipping containers offers a low-cost and unobtrusive method for inspecting the containers to detect potential terrorist threats due to nuclear material within a container that might be shielded using relatively high mass shielding such as lead, and for other purposes. On a statistical basis, cargo manifests can be assessed for accuracy, and unexpected heavy objects, such as lead shielding, can be detected within the container. Additionally, the system can be used as an independent supplement to other methods of sensing, such as radiation detection, to greatly reduce costly false alarm rates.

There are two methods of use of the present novel approach:

1. Cargo manifest assessment statistically compares the results from an automated detection of objects in the container based on the effect of their mass on the resonant vibration of the container with the manifest listing for the container. A mismatch, above a certain threshold of statistical likelihood for the declared manifest can then be flagged for further manual inspection. In practice, the distribution of objects based on their mass that is expected for non-suspect manifests can be built up over time using the regular flow of cargo through a port or inspection site.
2. Objects having relatively high mass density are found by detecting unusual signal spikes, representing high mass density, in the resonant vibration results for a container. The significance of the results for a specific container, as noted above, can be determined statistically using the high volume of cargo flowing through a port or inspection site. In addition the signal spikes in the resonant vibration detected for a container that indicate the presence (and location) of objects having relatively high mass density, can be compared with the levels detected by radiation sensors, to provide a further indication that shielding is being used for radioactive material disposed within the container.

Vibration Analysis

Shear wave vibration of a ridged structure moving in a single dimension can generally be approximated as a linear combination of spatial resonance modes that are amplitude modulated by associated time functions, and this relationship can generally be written as:

$$z(x, y, t) = \sum_i \phi_i(x, y) q_i(t) \tag{1}$$

where $z(x, y, t)$ is the displacement of a location $(x, y)$ at time $t$, $\phi_i(x, y)$ is the special resonance mode shape of the $i^{th}$ mode, and $q_i(t)$ is the associated time function of the $i^{th}$ mode.

The associated time functions are each described by a differential equation, which depends on three mode shape dependant constants: generalized mass, generalized stiffness, and generalized damping. This relationship is expressed as:

$$M_i \frac{d^2 q_i(t)}{dt^2} + C_i \frac{dq_i(t)}{dt} + K_i q_i(t) = F_i(t) \tag{2}$$

with $$M_i = \int_A \phi_i^2(x, y) m(x, y) dA \tag{3}$$

$$C_i = \int_A \phi_i^2(x, y) c(x, y) dA$$

$$K_i = T\{\phi_i^2(x, y), E(x, y, z)\}$$

$$F_i(t) = \int_A \phi_i(x, y) p(x, y, t) dA$$

where $M_i$ is the generalized mass of the $i^{th}$ mode, $C_i$ is the generalized damping of the $i^{th}$ mode, $K_i$ is the generalized stiffness of the $i^{th}$ mode, and $F_i(t)$ is the generalized applied force. Additionally, $m(x, y)$ is the mass distribution, $c(x, y)$ is the damping distribution, $p(x, y, t)$ is the pressure distribution, and $E(x, y, z)$ is the elasticity over the three-dimensional structure.

The differential equation indicated above for a ridged steel structure tends to be dominated by $K_i$ and $M_i$ due to the high elasticity and density of steel. This result leads to a sharp resonance peak for each mode with a natural frequency given by $$\omega_i^2 = K_i/M_i \tag{4}$$

where $\omega_i$ is the undamped natural radian frequency.

The mode shapes are approximated using a harmonic series of sinusoids based on the boundary conditions of the structure. The validity of this assumption is known to decrease with higher order modes due to the influence of non-uniform elasticity and mass distribution on mode shape which causes small distortions that can otherwise be ignored.

Vibrational Mass Imaging

The basis behind vibrational mass imaging of cargo shipping containers is that cargo resting on a structure tends to add mass without altering the stiffness of the overall container. This relationship enables the natural frequency equation noted above to be inverted so that the mass associated with each mode can be determined by measuring the resonant frequency and estimating the mode stiffness a priori. This approach is given by:

$$M_i = K_i/\omega_i^2 \tag{5}$$

where $M_i$ is the unknown generalized mass corresponding to the $i^{th}$ mode, $K_i$ is the predetermined generalized stiffness corresponding to the $i^{th}$ mode, and $\omega_i$ is the measured resonant frequency corresponding to the $i^{th}$ mode. The mass distribution or mass image of the container can then be estimated using a set of generalized masses determined by mounted accelerometers and vibration sources. The problem reduces to inverting the following set of equations:

$$M_1 = \int_A \phi_1^2(x, y) m(x, y) dA \tag{6}$$

$$M_2 = \int_A \phi_2^2(x, y) m(x, y) dA$$

$$\vdots$$

$$M_N = \int_A \phi_N^2(x, y) m(x, y) dA$$

where the unknown mass distribution is related to N estimated mode shapes and N estimated generalized masses. The mass image estimate is then given by:

$$\hat{m}(x,y) = T\{M_1, \ldots, M_N; \phi_1^2(x,y), \ldots, \phi_N^2(x,y)\} \tag{7}$$

where $T\{\ \}$ is an inverting transform. Using sinusoidal mode shapes, which are only accurate for lower order modes, this inverting transform becomes an inverse Fourier series approximation. Alternately, if the mode shapes are not assumed to be sinusoidal, the mass image could be determined by using the mode shapes as a set of basis functions with the generalized masses used as basis function weights.

Synchronous Frequency Estimation and Peak Detection

In order to estimate frequency modes and use them to image mass distributions, extremely accurate and low variability estimates of frequency peaks are needed. A key principle of the present novel approach is coherent detection, where the instantaneous frequency and phase of the vibration source are tracked independently from the resulting vibration, and independently from other acoustic noise sources. In one exemplary embodiment of this principal, the coherent estimate of phase is done by sensing the current waveform used by the vibration source or driver. This current waveform produces a periodic signal, which is phase-locked to the vibration source. The phase from this waveform can then be used to demodulate a received acoustic signal. Vibration source frequency is approximately related to the voltage applied to the source, yet the corresponding periodicity of the current waveform allows for a much more accurate estimate of the vibration source frequency and its phase. The use of this accurate frequency and phase results in extremely high signal-to-noise ratios in vibration sensing, and immunity to other natural and/or machine-made sources of vibration, and also reduces the cost of required vibration sources, and receivers (e.g., accelerometers).

Several questions related to this novel approach are discussed below. The answers to these questions have at least in part been provided by a number of tests of a representative shipping container. The questions include:

What are the lower limits of the mass of an object for detecting the object in a container?

What are the limits for distinguishing between multiple objects in a container based on their mass?

What are the limits for detecting a shielded nuclear device in an empty shipping container?

What are the limits for detecting a shielded nuclear device in a packed shipping container?

In regard to answering these questions, a series of exploratory experiments were carried out at the Port of Tacoma. These tests were intended to evaluate the practicality of a vibration-based cargo inspection system. In a configuration 40 shown in FIGS. 3 and 4, a straddle carrier 42 was outfitted with a set of seven accelerometers ($A_0$-$A_6$) and a vibration source or driver $V_0$ to measure the spectral changes in vibration propagation incurred by objects disposed in containers. Both dry and refrigerated ISO standard containers were used as representative samples of the types of shipping containers that typically pass through ports. The findings of these tests verify that a vibration source mounted on the straddle bar can produce vibrations that propagate through a lifted container at detectable levels, as measured by a plurality of accelerometers (or other vibration sensors).

Experimental Setup

Figure 1:
Figure 2:
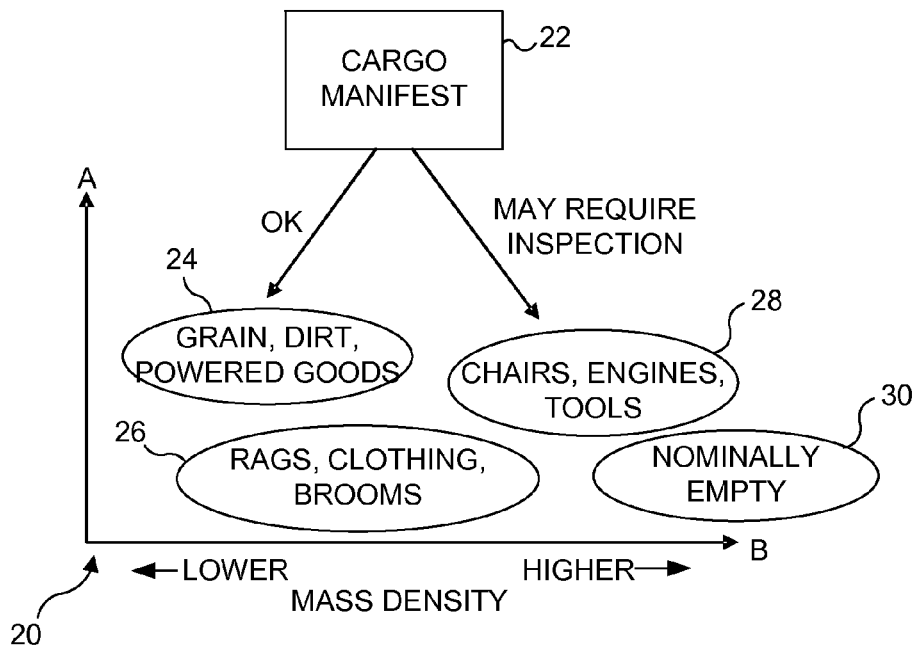
Figure 3:
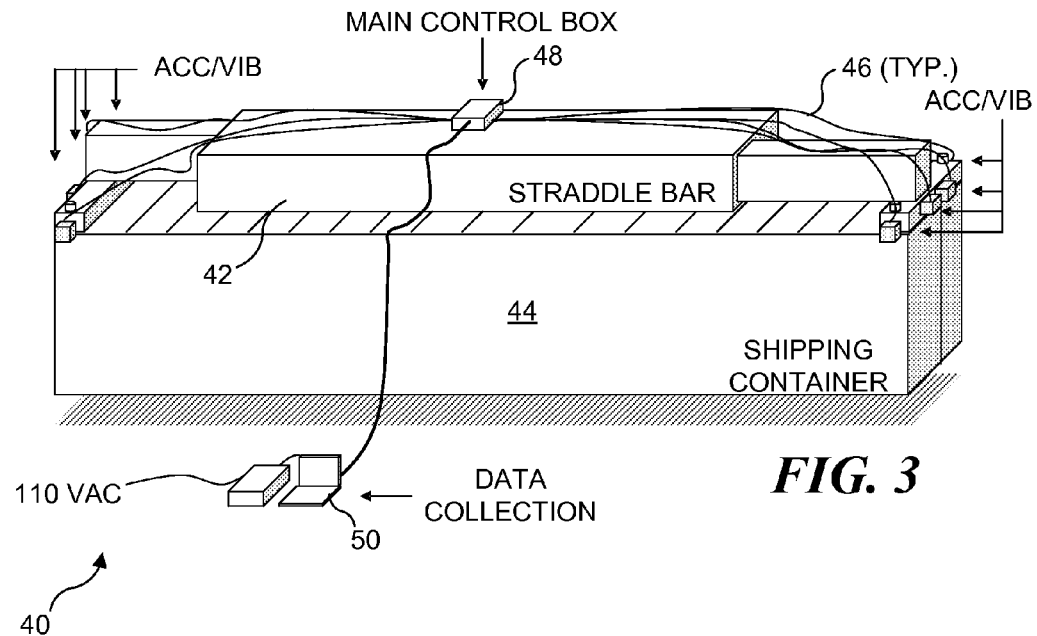
Figure 4:
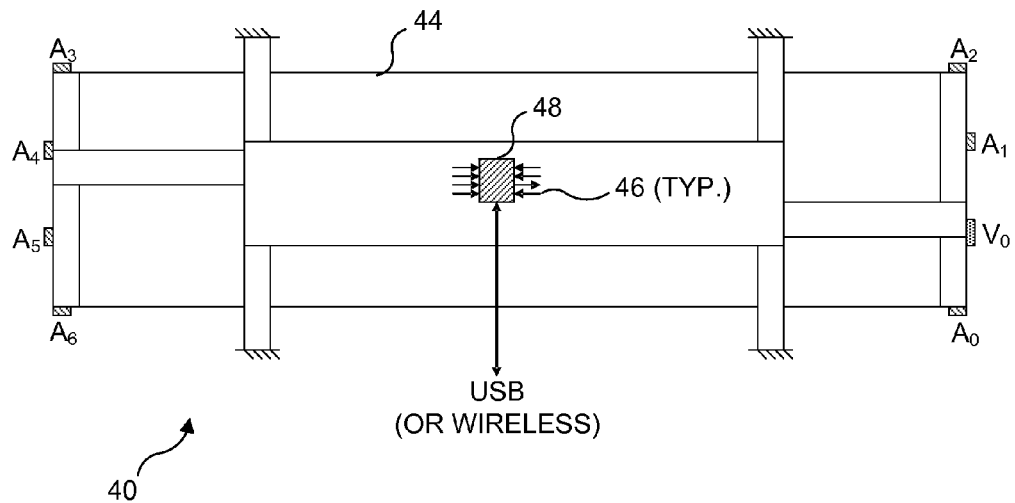

The seven accelerometers and one vibration source were mounted on the spreader bar as shown in FIGS. 3 and 4. This placement was chosen for this initial test to minimize the obtrusiveness of the sensors in a deployed system, while maintaining maximum coupling between the sensors and the container frame. For each experiment in this initial test, a container 44 was lifted off the ground to a height of one foot, loaded with one or more test objects, closed, locked, and scanned. Leads 46 (not fully shown in FIG. 4) coupled the accelerometers and vibration source to a main control box 48, which was in turn, connected to a data collection device 50 (such as a laptop computer).

Figure 5:
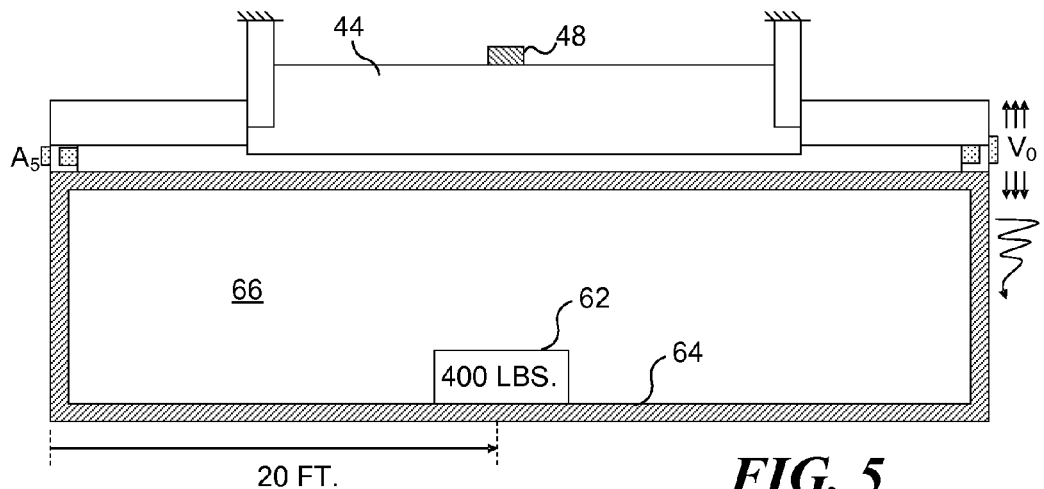
Figure 8:
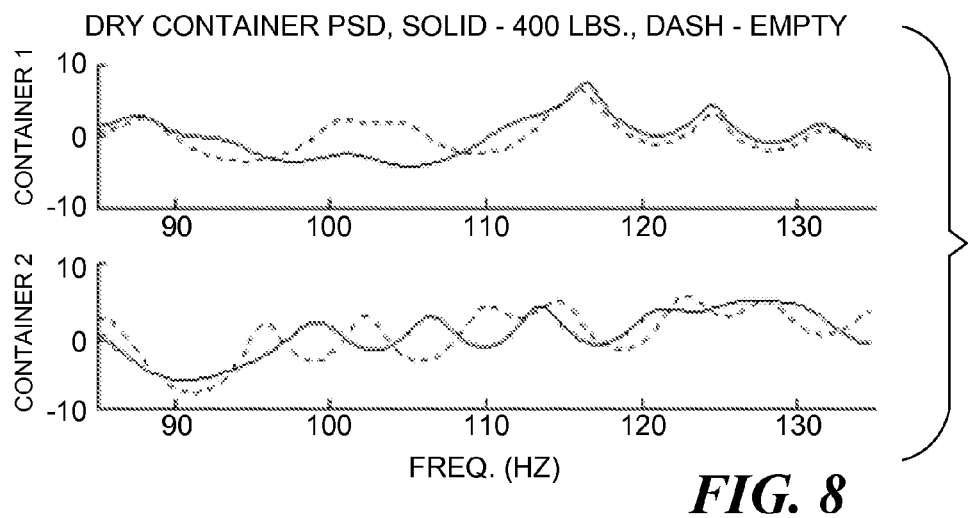
FIG. 8 are graphs for two dry containers showing the power spectral density (PSD) of the accelerometer data in the presence of the 400 lb.-mass (solid line) and for empty containers (dash line), wherein the difference caused by the mass is clearly evident.
Figure 9:
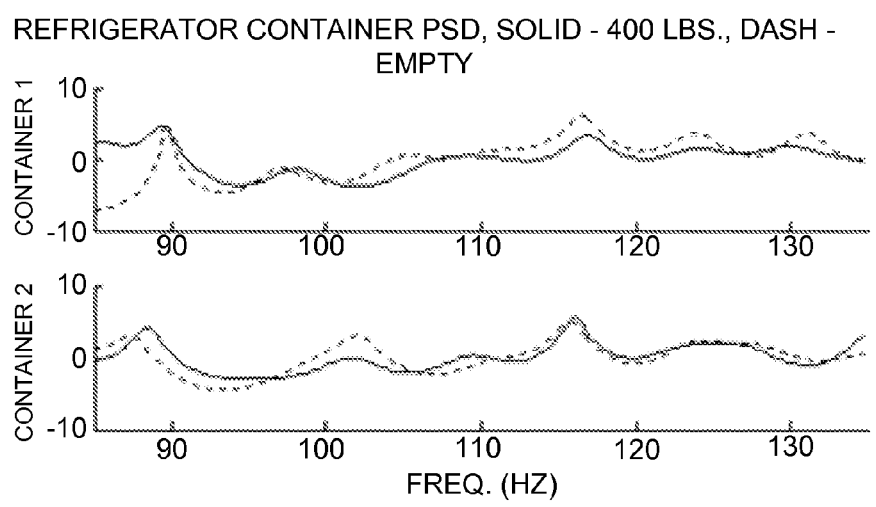
FIG. 9 are graphs for two refrigerated containers showing the PSD of the accelerometer data in the presence of the 400 lb.-mass (solid line) and for empty containers (dash line), wherein the difference caused by the mass is again clearly evident.

In a first test, six containers were scanned with two different packing configurations, including one configuration with a centered 400 lb.-mass, and one configuration with no mass included in the container. A configuration 60 with the 400 lb.-mass 62 on a floor 64 of a container 66 is shown in FIG. 5. Each vibration scan included two stepped vibration chirps (produced by the vibration source), including one with a frequency increasing from about 20 Hz to about 90 Hz, and one with a frequency increasing from about 85 Hz to about 135 Hz. The results for two dry containers and for two refrigerated containers are shown respectively in FIGS. 8 and 9. By comparing the frequency response for the containers when empty (dash line) with the container when loaded with the 400 lb.-mass (solid line), it will be evident that the effect of the 400 lb.-mass on the container vibration resonance response is readily evident.

FIG. 11 illustrates offset plots 140 of the cross power spectral density (PSD) between all seven accelerometers and shows the location dependant resonances. A bottom plot 142 is the impact closest to the door while the top plot is the impact closest to the back. Each step vertically represents a displacement of 2 ft. The metal flooring at the back of the container added the rich spectral content at the top of the Figure. In addition, expanded views 150 and 160 in FIGS. 12 and 13, respectively, for the PSD of FIG. 11, shows resonances that are correlated with the position of the impact. These resonances may have potential uses in imaging the object in the cargo or localizing activity inside a container.

Internal Impact Responses

Figure 6:
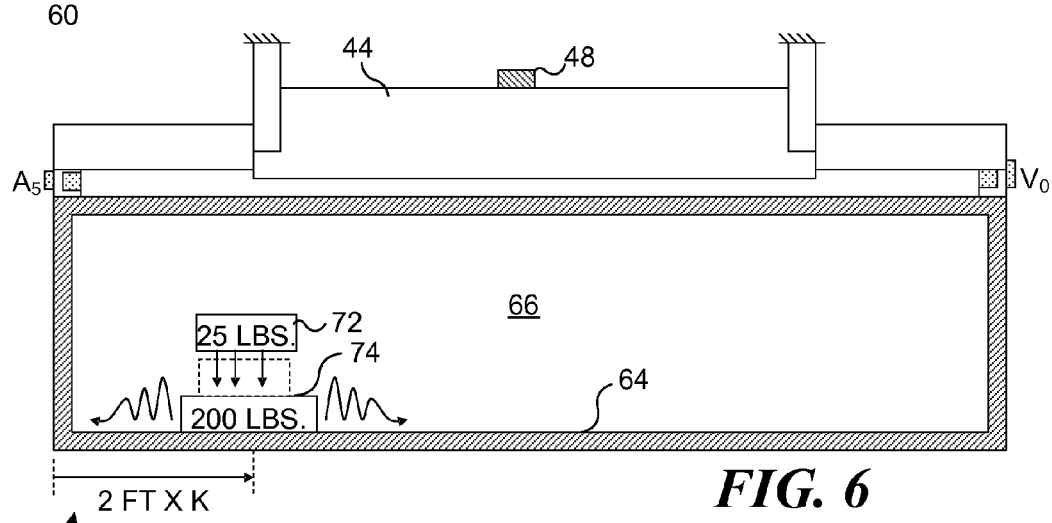

The second test measured the vibration transfer between container floor 64 and the accelerometers mounted on spreader bar 44, as detailed in a schematic diagram 70 in FIG. 6. During this test, a mass 72 of 25 lbs. was dropped at intervals of about 2 ft. along the central longitudinal axis of container 66. A person 74 weighing about 200 lbs. handled and dropped the mass during this test. It was previously unknown whether a small vibration source mounted on one end of the spreader bar would effectively couple vibrations into the container frame sufficiently to excite the container in order to detect the effects of objects comprising the cargo on the container resonant vibration. The primary concern was that the relatively high stiffness and damping of the surrounding container structure would suppress the vibration transmission to non-detectable levels.

Figure 10:
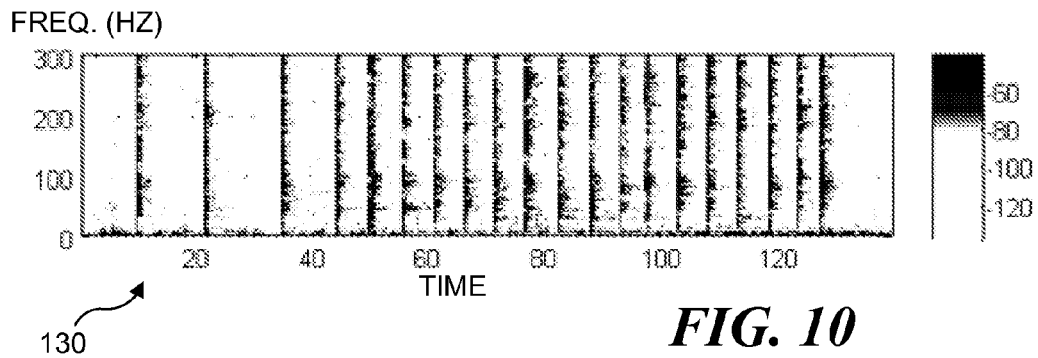
FIG. 10 is a spectrogram showing the impact results for 20 impacts as seen by accelerometer $A_1$, in connection with the test of FIG. 6.

However, as is evident from a spectrogram graph 130 for accelerometer $A_1$ in FIG. 10, wherein each frequency spectrum line corresponds to a different one of the 20 positions where the 25 lb.-mass struck floor 64, the vibration tests confirmed that a vibration source can effectively coupled vibration into a container frame. In addition, the coupling from the vibration source driving the container was sufficiently strong so that the vibrations of the container could be readily felt and heard while standing inside or touching the container. This field test verification is thus a strong indicator that a small vibration source mounted on a spreader bar is sufficiently strong and couples sufficiently well into the structure of the container to excite the container/cargo in a deployable inspection system.

Verification that Steel Frame of a Shipping Container Has Low Mechanical Damping and Can Sustain Sharp Resonances It was previously unknown whether lifting a shipping container with a straddle carrier would significantly dampen the resonances caused by a vibration source or driver. Prior testing showed little damping in the steel frame of a shipping container when the container being excited by a vibration driver was resting on cement blocks. However, it was possible that lifting the container might significantly alter the damping characteristics of the shipping container.

The impact tests illustrated in FIG. 6 showed that sustained resonances continued for more than five seconds in a container that had been lifted with a straddle carrier after the container was excited to vibrate by dropping 25 lb.-mass 72 onto the floor of the container, which implies very little damping of containers occurs in this lifted configuration.

Figure 7A:
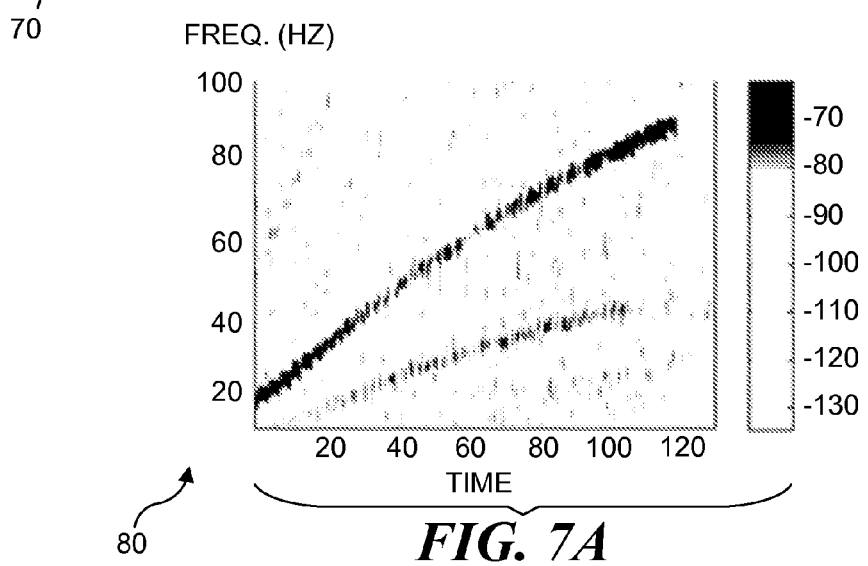
FIG. 7A is a graph showing a vibration sweep of the container from about 20 Hz to about 90 Hz, wherein a clear sub-harmonic due to non-linearities in the vibration source is evident.
Figure 7B:
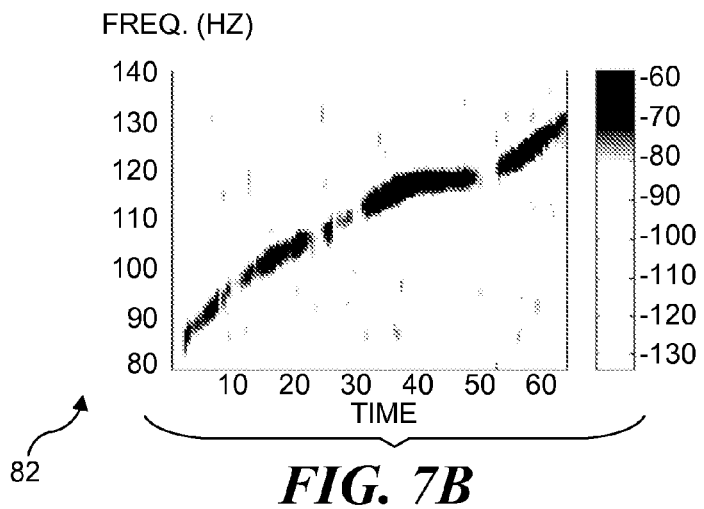
FIG. 7B is a graph showing vibration sweep of the container from 85 Hz to about 135 Hz.

Another test verified that the spectra of the returned vibration of a container was sensitive to added weight disposed within the container. The results of the vibration testing showed that the measured resonance response of a container when lifted by a straddle carrier system was altered by loads in the container. Clear distortion in the spectral response in the measured range from about 85 Hz to about 135 Hz can be seen in spectral graphs 80 and 82 in FIGS. 7A and 7B, respectively. With a much wider bandwidth and higher signal, it is expected that many more features can be resolved in the signal detected by the accelerometers.

Determination of A Baseline for Accelerometer Noise and Vibration Source Coupling The most significant outcome from these first set of experiments was a measure of the noise floor and coupling through the system comprising the container suspended from the straddle bar carrier that includes a vibration source and a plurality of accelerometers that contact and couple with the structure of the container. In this test, evaluation of vibrational inspection can be divided into five stages. First, the sensitivity of standing waves on the surface of the container can be mapped for two cargo configurations. Second, the mapping data can be used to locate optimal sensor locations on the exterior of a container. Third, the mapping data can be used to evaluate theoretical models. Fourth, the optimal sensor locations can be used to determine the sensitivity of the vibration resonance of a container to the location of cargo in the container. Fifth, the resolution of the vibrational inspection system can readily be determined.

Two new instruments were employed to implement this further research, including a high precision vibration source 90 (driven by an amplifier 92), and a set of wireless accelerometers 94 (examples of which are shown in FIGS. 14 and 15). A high precision vibration source has superior stability and avoids the nonlinearities of non-concentric weight sources used in earlier experiments. Wireless accelerometers enable random sampling of vibrations on the container surface, which is required in stage one and four.

Data collection is divided into two key experiments associated with stage one and four, as indicated above. The other three stages are primarily data processing. For the experiment in stage one, additional weights are required to fully cover the container floor. Loading the floor down its length with 50 lb.-weights that are spaced apart every foot is useful for the sensitivity measurements. The total test mass for the experiment is thus 1,950 lbs., which equates to 78×25 lbs. or thirty-nine 50 lb.-weights. The experiments in stage two should only require a subset of the weights in stage one.

Sensitivity Mapping Empty vs. Full

An important experiment of this research program was determining the external locations on the container that are vibration sensitive to cargo disposed inside the container. Since an exhaustive search of every possible sensor, source, and cargo configuration is impossible, assumptions must be made to make analysis tractable. These assumptions aim to limit the number of configurations, while still preserving a representative sample.

Rather then testing every possible cargo configuration, two were chosen, including an empty container, and a container with an evenly distributed mass on the floor. The strong assumption is that an evenly distributed mass acts as a superposition of every cargo configuration on the floor. In addition, it is assumed that the disturbances caused by each element do not cancel.

Instead of placing the source and sensors at every possible location on the spreader bar, pseudorandom sampling was employed. The common assumption is that the underlying sensitivity distribution (map) is a smoothly varying function over the surface of the container. This assumption allows a wide array of curve fitting algorithms to be brought to bear on the sensitivity map generation. This assumption is common in factorial experiments, which have a deep theoretical background and were first popularized many years ago.

The concept of sensitivity mapping of surface vibrations is illustrated in FIG. 16. A vibration source $V_1$, and a set of accelerometers $A_1$ to $A_4$ are distributed so that they are in contact and couple with the exterior surface of a container 100 when a spreader bar (not shown in this Figure) is used to lift and support the container while the container is being moved. The spectral transfer function between the accelerometers and vibration source via the container are recorded when the container is empty and after a uniform mass is placed inside the container. The process is repeated several times for good coverage of the container, and a sensitivity map is generated. Peaks 102, 104, 106, and 108 in the sensitivity map correspond to locations on the surface of the container that showed the greatest change in vibration spectra between the two cargo configurations—i.e., between the empty container and the container with the uniform mass distribution.

The sensitivity mapping should be repeated for each class of container that will pass through a facility. Then, when a specific container is being handled, a database with the sensitivity mapping for the class of container of which that specific container is a member can be employed for automatically repositioning the accelerometers or other type of vibration sensors to generally correspond to the peak sensitivity positions for containers of that type. Alternatively, an average of the peak sensitivity mapping locations for all classes of containers likely to pass through a facility may be employed for all containers (regardless of the class of which the container is a member), to provide less than optimal, but still acceptable, sensitivity for the vibration sensors to the resonant vibrations of the container.

Algorithms for Locating Sensitivity Maxima for Optimal Sensor Placement

The second stage of the research serves to locate the optimal sensor placement on the surface of the container. Selection of the locations for placing the accelerometers can be based on the sensitivity map generated in the first stage. As discussed above, the assumption is that the sensitivity map is representative of all common cargo configurations. The assumption should hold particularly well at low frequencies where wavelengths are long and spread out over the surface of the container. As the probing frequency increases, the assumption should start to fail as vibration disturbances become increasingly localized.

Fundamentally, optimal sensor placement can be viewed as a data dimensionality reduction, which is classic to the field of information theory. In general, locations are chosen that maximize sensitivity, while minimizing the correlation between sensors. This relationship is true, because perfectly correlated sensors are redundant. The most common method and a standard benchmark is principal component analysis (PCA).

The sensor placement process is indicated by the relationships shown in FIG. 16. Sensitivity maxima or peaks in the sensitivity map generally correspond to the positions for the optimal locations of the vibration sensing accelerometers shown in the diagram for a theoretical test container. In this Figure, the vibration source is labeled $V_1$, and the sensor locations are labeled $A_1$ though $A_4$. Again, although it may be desirable to position accelerometers or other type of vibration sensors at these optimal locations of maximum sensitivity as determined for each class of containers, it may instead be more practical to simply determine positions that correspond to the average of the optimal locations of maximum sensitivity, for all classes of container, so that the vibration sensors can simply be placed to couple with a container at fixed locations when the container handling mechanism is used for moving the containers, so that objects comprising the cargo of the container can simultaneously be detected by analyzing the effect of the objects on the resonant vibrations of the container.

Vibration Modeling

The third stage of the research is directed to ascertaining a model of the container, cargo, and transducer interaction. While this research does not require accurate physical modeling, it is very valuable for generalizing and extrapolating the results. The standard model for vibration in a ridged structure such as a container decomposes the vibration into a sum of weighted modes of vibration, with associated damping constants and resonant frequencies. This technique is commonly carried out using finite element analysis (FEA). The process includes the step of estimating a system matrix and matching its eigenvectors and Eigen values with measured mode shapes and resonance frequencies respectively.

Localization Sensitivity Experiments

The fourth stage of the research quantifies the sensitivity of surface vibrations to the location of objects comprising the cargo within the container. The approach used is similar to stage one, but rather than pseudorandomly arranging the sensors on the container exterior, test masses can be pseudorandomly arranged on the container floor. The resulting signal variations can then be projected into a high dimensional space, where a smooth sensitivity map can be generated. To reduce the combinatorial complexity of the experiments, the sensor locations can be fixed in the optimal sensor locations determined in stage three, as discussed above.

Localization sensitivity mapping is fundamentally harder than mapping the two state sensitivity of stage one. This difficulty is due to the increase in complexity from two states to a continuum of states. Fortunately, a rich set of theoretical techniques have been developed for dealing with such data. The increase in complexity adds to the potential information that can be determined about the cargo. If, as expected, localization is successful, imaging and locating specific objects in the cargo becomes feasible, opening a wide door of possibilities for characterizing the objects comprising the cargo disposed in a container, as well as their positions in the container.

Resolution Estimate for a Standing Wave Vibration Inspection System

The fifth and final stage of the research program combines all of the information gathered in the preceding stages into a theoretical estimate of inspection resolution. The estimate includes the accuracy of classifying a container as empty, localizing a single object of relatively high mass density inside the container, and determining the mass distribution of objects comprising the cargo across the floor of the container. The resolution estimate provides a foothold for a vast array of complex interrogation schemes that are based on vibration analysis as explained above.

Overview of Exemplary Logical Steps Implemented

FIG. 17 is a flowchart 200 illustrating exemplary logical steps that are implemented by the vibration analysis inspection system as described above, to identify unknown objects contained within a container 202. A block 204 indicates that a vibration mode estimation provides mechanical excitation of the unknown contents container (e.g., using the vibration source discussed above) and measures the response with a set of accelerometers. The results of this vibration mode estimation are mode frequency responses and mode shapes that together comprise unknown container (contents) modal data. The modal data are input to an inspection system data analysis block 206, which comprises three sub-blocks, including one sub-block that fits against parametric models in a block 208, another sub-block that matches against the known contents of comparable containers (simulated or real) in a block 210, and a third sub-block that is employed for historical similarity analysis in a block 212. The results of the procedures implemented by sub-blocks 208, 210, and 212 are input to a threat analysis block 214, which determines the nature of the objects comprising the cargo of the unknown container, its potential threat level, and provides recommendations for the steps that should next be taken to deal with the container if any.

Details of sub-block 208 for fitting the modal data for the unknown contents container to parametric models are provided in FIG. 18. In this procedure, a plurality of parametric models 220 and 222, etc. are employed by parameter estimators 224 and 226, etc. to determine fit measures and data fit models 228, 230, etc. The fit measure provides an indication of how closely a specific parametric model matches the data fit model developed by the parameter estimator from the modal data for the unknown contents container.

In FIG. 19, details of sub-block 210 are shown. In this Figure, a block 240 indicates that a finite element method (FEM) simulation example is used to provide mode frequency responses and mode shapes data to an example database 242. The database is then a source of such data for input to a comparator 250, along with data from another example database 248, which comprises mode frequencies and mode shapes produced by vibration mode estimation in a block 246 as a result of mechanical excitation of a container 244 with known objects. Also input to comparator 250 are the modal data for the unknown contents container being evaluated. The comparator uses all of the input data to provide a ranked list of matches in a block 252.

Historical similarity statistics are generated in sub-block 212, as shown in more detail in FIG. 20. In this Figure, the modal data for the current container with unknown contents are added to a past history database 260. The past history database of previously collected modal data is then input to a comparator 262, unlike with the modal data for the current container with unknown contents. The comparator uses the past data and the current data to compile historical similarity information, as indicated in a block 264.

FIG. 21 illustrates a table 270 showing fit scores for the parametric model for an exemplary container with unknown contents. To simplify this example, only three rows are illustrated, including a row 272 showing a fit score of 0.85 for a parametric model with one dense mass in a uniform fill container, as shown in a corresponding diagram. Similarly, rows 274 and 276 provide fit scores respectively for a parametric model with two dense masses in a uniform fill container with corresponding diagram, and for a parametric model having one dense mass in an otherwise empty container with corresponding diagram. The parameter summary included with each diagram in a row indicate the size, approximate mass, and distance from the door of each dense mass in the container. The user can click on a control button to access a more detailed analysis of each parametric model.

An example of matches to known container contents is shown in FIG. 22 in a table 280 for each of three exemplary rows 282, 284, and 286 corresponding to three different container content matches. Each row of this table shows the match score for the current container with unknown contents, relative to the known contents of a corresponding container, as well as the layout of the objects comprising the contents. Optionally, a user can click on the layout for displaying a photo that shows how the known contents appeared, and can click on a control button to access a more detailed analysis of the match.

Similarly, an example of a table 290 showing historical similarity statistics derived by comparing the historical modal data for other containers to the current container with unknown contents is shown in FIG. 23. This table shows statistics relating to exact matches, and similar matches, along with the match frequency for each, and the number of threat matches identified. Flags drawing attention to data unique to the current container are also included in table 290.

After processing the different results output from the inspection system data analysis, the threat analysis is produced. An exemplary threat analysis output table 300 is shown in FIG. 24. This table indicates the nature of the contents of the current container being evaluated, a threat level (0-10) for the type of content detected, and for any type of cargo content that justifies further action, provides a recommendation of the action that should be taken. For example, if a small dense object that might be a nuclear device were detected, the threat level would be set at level 10, and the recommended action would be to attempt radiation detection and search or implement a different form of scan of the container to attempt to confirm whether the object is a nuclear device. In some cases, these recommendations might be automatically implemented, based on the threat analysis for the current container being evaluated.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for using a vibration analysis to detect an object within a freight shipping container, based on a mass of the object, comprising the steps of:
   (a) while the container is being supported, using a vibration source for exciting the container to vibrate;
   (b) coupling a plurality of vibration sensors to the container at a plurality of spaced-apart locations;
   (c) using the plurality of vibration sensors to sense resonant vibrations of the container due to the vibration source, wherein an arrangement of the spaced-apart locations of vibration sensors can effectively sense the resonant vibrations of two or more classes of container;
   (d) sensing resonant vibrations of the container in response to the excitation of the container by the vibration source; and
   (e) using a computing device, identifying a location of one or more objects disposed within the container by at least analyzing the resonant vibrations of the container that were sensed at one or more locations of the plurality of spaced apart locations, so as to detect a resonant vibration response of the container caused by a presence of the object disposed within the container, the response being a function of the object's mass.

2. The method of claim 1, further comprising the step of supporting the container with a container handling mechanism; and wherein the vibration source and the plurality of vibration sensors are either supported by the container handling mechanism so that they contact the container, or are coupled to the container, while the container is being supported by the container handling mechanism.

3. The method of claim 1, further comprising the step of comparing a cargo manifest that indicates contents expected to be within the container, with one or more objects detected in the container, to determine whether the one or more objects detected were expected to be within the container.

4. The method of claim 3, further comprising the step of comparing the cargo manifest with a distribution of objects detected within the container, to determine if the distribution of the objects is consistent with the cargo manifest for the container.

5. The method of claim 1, further comprising the step of comparing a position where an increased level of radiation was detected within a container to a position where an object having a relatively high mass density was detected, to evaluate whether said object may include a radioactive material and high mass density radiation shielding.

6. The method of claim 1, further comprising the step of modeling an interaction of the container, one or more objects included in the container, and the plurality of vibration sensors, to create a vibration model used for characterizing contents of the container, as a function of a mass of the contents.

7. The method of claim 1, further comprising the step of using the resonant vibrations of the container that are sensed at the plurality of spaced-apart locations for localizing a mass distribution of objects comprising a cargo disposed within the container.

8. A non-transitory computer readable medium containing computer instructions stored therein for causing a computer processor to perform operations including:
   detecting a location of an object within a freight shipping container that is being supported by a container handling mechanism, as a function of the mass of the object, by analyzing resonant vibrations of the container that are sensed at a plurality of spaced-apart locations on the container so as to detect an alteration of the resonant vibrations of the container caused by a presence of the object in the container, wherein a presence of the object in the container affects the resonant frequency of the container compared to the resonant frequency of the container when said object is not disposed in the container; and wherein the plurality of vibration sensors comprise an arrangement of spaced apart locations that effectively senses the resonant vibrations of two or more classes of containers.

9. A system for using vibration analysis to detect an object within a freight shipping container, based on a mass of the object, comprising:
   (a) a vibration source that is configured to be coupled to the container; and
   (b) a plurality of vibration sensors that are positioned to couple with the container at a plurality of spaced-apart locations to sense resonant vibrations of the container due to the vibration source, wherein an arrangement of the spaced-apart locations of vibration sensors effectively senses the resonant vibrations of two or more classes of containers that pass through a facility,
   (c) a computing device that is coupled to the vibration source and to the plurality of vibration sensors, the computing device including:
      (i) a memory in which machine readable and executable software instructions are stored; and
      (ii) a processor that is coupled to the memory, the processor executing the software instructions to carry out a plurality of functions, including:
         (A) controlling the vibration source to excite the container to vibrate;
         (B) receiving vibration sensor output signals from the plurality of vibration sensors;
         (C) analyzing the vibration sensor output signals to determine resonant vibrations of the container so as to detect an object disposed in the container as a function of a mass of the object, based upon an effect of the object on the resonant vibrations of the container, and to identify a location of the object disposed in the container based on the effect of the object upon the resonant vibrations of the container; and
         (D) providing an indication of an object detected in the container 10. The system of claim 9, further comprising a container handling mechanism that is configured to lift and support a container, wherein the vibration source and the plurality of vibration sensors are automatically coupled with the container at the plurality of spaced-apart locations, when the container is being lifted by the container handling mechanism.

11. The system of claim 9, wherein the software instructions further enable a comparison of a cargo manifest that indicates one or more objects expected to be disposed within the container, with one or more objects detected in the container, to determine whether there is a mismatch.

12. The system of claim 11, wherein the software instructions further cause the processor to enable a comparison of the cargo manifest with a distribution of objects detected within the container, to determine if the distribution of the objects detected is consistent with the cargo manifest for the container.

13. The system of claim 9, wherein the software instructions further cause the processor to respond to an indication that a position where an increased level of radiation was detected within a container corresponds to a position where an object having a relatively high mass density was detected, by evaluating whether said object may include a radioactive material and radiation shielding for the radioactive material.

14. The system of claim 9, wherein the software instructions further cause the processor to create a model of an interaction of the container, one or more objects included in the container, and the plurality of vibration sensors, for use in characterizing contents of the container, as a function of a mass of each of the one or more objects comprising the contents.

15. The system of claim 9, wherein the software instructions further cause the processor to use the resonant vibrations of the container that are sensed by the vibration sensors at the plurality of spaced-apart locations to be used for localizing a mass distribution of one or more objects comprising the cargo that are included within the container.

16. A method, comprising the steps of:
    (a) while a container is being supported, using a vibration source for exciting the container to vibrate;
    (b) coupling a plurality of vibration sensors to the container at a plurality of spaced-apart locations;
    (c) using the plurality of vibration sensors to sense the resonant vibrations of the container due to the vibration source; wherein an arrangement of the spaced-apart locations of vibration sensors can effectively sense the resonant vibrations of the two or more classes of containers;
    (d) using a computing device, determining a vibration signature for the container based upon the resonant vibrations of the container that were sensed; and
    (e) using the computing device, detecting a presence of one or more objects within the container by comparing the vibration signature determined for the container with reference vibration signature data determined for a similar empty container, to determine a location of the one or more objects within the container.

17. The method of claim 16, further comprising the step of using the computing device for comparing the vibration signature determined for the container with reference vibration signature data determined for a similar empty container, to determine at least one of a plurality of conditions of the container, including:
    (a) that the container is empty;
    (b) that the container contains homogeneous objects;
    (c) that the container contains heterogeneous objects; and
    (d) a distribution of one or more objects within the container.

18. The method of claim 17, wherein the reference vibration signature data is part of a database of reference vibration signature data, further comprising the step of compiling the database of reference vibration signature data for a plurality of different types of containers, by measuring a reference vibration signature for each of the plurality of different types of containers while said containers are empty.

19. The method of claim 16, further comprising the step of using the computing device for comparing the vibration signature determined for the container with historical vibration signature data previously collected for a plurality of similar containers and contents thereof, to determine a match to the historical vibration signature data for one or more of the similar containers by the vibration signature data for the container, to determine possible contents of the container, wherein the possible contents correspond to contents of the one or more similar containers.

20. A system, comprising:
    (a) a container;
    (b) a vibration source that is configured to be coupled to the container; and
    (c) a plurality of vibration sensors that are positioned to couple with the container at a plurality of spaced-apart locations to sense the resonant vibrations due to the vibration source, wherein an arrangement of the spaced-apart locations of vibration sensors is optimal for maximum sensitivity for the resonant vibrations of two or more different classes of container that pass through a facility
    (d) a computing device that is coupled to the vibration source and to the plurality of vibration sensors, the computing device including:
        (i) a memory in which machine readable and executable software instructions are stored; and
        (ii) a processor that is coupled to the memory, the processor executing the software instructions to carry out a plurality of functions, including:
            (A) controlling the vibration source to excite the container to vibrate;
            (B) sensing resonant vibrations of the container using the plurality of vibration sensors;
            (C) analyzing the sensed resonant vibrations of the container to determine a vibration signature for the container; and
            (D) detecting a presence of one or more objects within the container by at least comparing the vibration signature determined for the container with reference vibration signature data determined for a similar empty container, to determine a location of the one or more objects within the container.

21. The system of claim 20, wherein the software instructions further cause the processor to compare the vibration signature determined for the container with reference vibration signature data determined for a similar empty container, to determine at least one of a plurality of conditions of the container, including:
    (a) that the container is empty;
    (b) that the container contains homogeneous objects;
    (c) that the container contains heterogeneous objects; and
    (d) a distribution of one or more objects within the container.

22. The system of claim 21, wherein the reference vibration signature data is part of a database of reference vibration signature data that is accessible by the processor, the database of reference vibration signature data having been compiled for a plurality of different types of containers, by measuring a reference vibration signature for each of the plurality of different types of containers while said containers are empty.

23. The system of claim 20, wherein the software instructions further cause the processor to compare the vibration signature determined for the container with historical vibration signature data previously collected for a plurality of similar containers and contents thereof, to determine a match to the historical vibration signature data for one or more of the similar containers by the vibration signature data for the container, to determine possible contents of the container, wherein the possible contents correspond to contents of the one or more similar containers.

24. The method of claim 1, wherein the step of object location identification comprises identifying a location of two or more objects disposed within the container.

25. The non-transitory computer readable medium of claim 11, wherein the location detection operation comprises detecting locations of two or more objects within the freight shipping container.

26. The system of claim 9, wherein the vibration sensor output analysis function detects two or more objects disposed in the container and identifies a location of the two or more objects disposed in the container; and wherein an indication is provided for the two or more objects detected in the container.

27. The method of claim 16, wherein the object detection step comprises detecting the presence of two or more objects and determining the location of the two or more objects within the container.

28. The system of claim 20, wherein the object detection function comprises detecting the presence of two or more objects and determining the location of the two or more objects.

29. A method for using a vibration analysis to detect an object within a freight shipping container, based on a mass of the object, comprising the steps of:
   (a) while the container is being supported, using a vibration source for exciting the container to vibrate;
   (b) sensing resonant vibrations of the container in response to the excitation of the container by the vibration source, at a plurality of spaced-apart locations that are coupled with the container; and
   (c) using a computing device, identifying a location of two or more objects disposed within the container by at least analyzing the resonant vibrations of the container that were sensed at one or more locations of the plurality of spaced apart locations, so as to detect a resonant vibration response of the container caused by a presence of the two or more objects disposed within the container, the response being a function of the object's mass.

30. A system for using vibration analysis to detect two or more objects within a freight shipping container, based on masses of the objects, comprising:
   (a) a plurality of vibration sensors that are positioned to couple with the container at a plurality of spaced-apart locations;
   (b) a vibration source that is configured to be coupled to the container; and
   (c) a computing device that is coupled to the vibration source and to the plurality of vibration sensors, the computing device including:
      (i) a memory in which machine readable and executable software instructions are stored; and
      (ii) a processor that is coupled to the memory, the processor executing the software instructions to carry out a plurality of functions, including:
         (A) controlling the vibration source to excite the container to vibrate;
         (B) receiving vibration sensor output signals from the plurality of vibration sensors;
         (C) analyzing the vibration sensor output signals to determine resonant vibrations of the container so as to detect the two or more objects disposed in the container as a function of the masses of the objects, based upon an effect of the objects on the resonant vibrations of the container, and to identify locations of the objects disposed in the container based on the effect of the objects upon the resonant vibrations of the container; and
         (D) providing an indication of the objects detected in the container.

* * * * *